United States Patent
Iwai et al.

(10) Patent No.: US 7,540,214 B2
(45) Date of Patent: Jun. 2, 2009

(54) MANIPULATOR-TYPE ROBOT

(75) Inventors: Seiji Iwai, Hyogo (JP); Shiaki Suzuki, Hyogo (JP); Takayasu Ohara, Osaka (JP); Misao Umemoto, Hyogo (JP); Kenichiro Dobashi, Hyogo (JP)

(73) Assignee: Panasonic Corporation, Osaka (JP)

( * ) Notice: Subject to any disclaimer, the term of this patent is extended or adjusted under 35 U.S.C. 154(b) by 411 days.

(21) Appl. No.: 10/587,350

(22) PCT Filed: Feb. 15, 2006

(86) PCT No.: PCT/JP2006/302617

§ 371 (c)(1),
(2), (4) Date: Jul. 26, 2006

(87) PCT Pub. No.: WO2006/120786

PCT Pub. Date: Nov. 16, 2006

(65) Prior Publication Data
US 2008/0260510 A1    Oct. 23, 2008

(30) Foreign Application Priority Data
May 12, 2005  (JP) ............................. 2005-139555

(51) Int. Cl.
  *B25J 17/00* (2006.01)
(52) U.S. Cl. ...................... 74/490.02; 901/49
(58) Field of Classification Search ............. 74/490.01, 74/490.02, 490.03, 490.05; 901/23, 24, 49
See application file for complete search history.

(56) References Cited

U.S. PATENT DOCUMENTS 5,437,207 A * 8/1995 Zimmer .................. 74/490.02
6,113,343 A    9/2000 Goldenberg et al.
6,477,913 B1 * 11/2002 Akeel et al. .............. 74/490.03
2004/0052630 A1 * 3/2004 Nihei et al. ................ 414/730
2004/0237154 A1 * 11/2004 Hezel et al. ................. 901/29

FOREIGN PATENT DOCUMENTS

| EP | 1 396 314 | 3/2004 |
|---|---|---|
| JP | 59-76074 | 5/1984 |
| JP | 59-176771 | 11/1984 |
| JP | 11-129070 | 5/1999 |
| JP | 11-129185 | 5/1999 |
| JP | 2003-025270 | 1/2003 |
| JP | 2004-098174 | 4/2004 |
| WO | 98/52724 | 11/1998 |
| WO | 99/21689 | 5/1999 |

OTHER PUBLICATIONS

Supplemental European Search Report and Examiner's Opinion, issued Sep. 25, 2007 in European Application 06713758.8-2316, which is a counterpart of the present application.

* cited by examiner

*Primary Examiner*—David M Fenstermacher
(74) *Attorney, Agent, or Firm*—Wenderoth, Lind & Ponack, L.L.P.

(57) ABSTRACT

In a manipulator-type robot of the present invention, a manipulator base contains a connection case for making cable connections to an external device. In the connection case, a signal-line connecting section for external connection is disposed on a predetermined signal line of a cable that is routed through the inside of the manipulator. The connection case contains, other than the aforementioned signal-line connecting section for making connections to the outside, an additional signal-line connecting section.

12 Claims, 8 Drawing Sheets

FIG. 9A – PRIOR ART
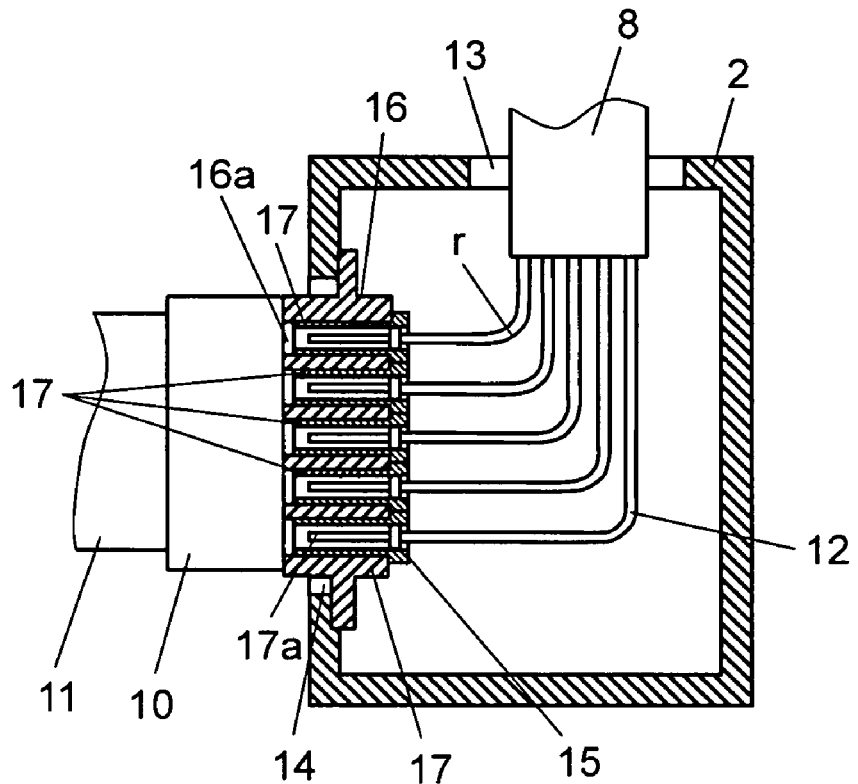
FIG. 9B – PRIOR ART
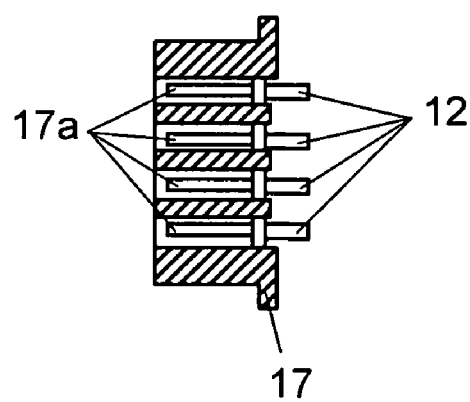

MANIPULATOR-TYPE ROBOT

This application is a U.S. national phase application of PCT International Application PCT/JP2006/302617, filed Feb. 15, 2006.

TECHNICAL FIELD

The present invention relates to a connection with use of a connector between a manipulator of a manipulator-type industrial robot and an external device.

BACKGROUND ART

A manipulator-type industrial robot (hereinafter referred to as a robot) generally contains electric cables, fluid pipes for supplying air or gas, and the like. These cables and pipes are used in a motor driving joint axes of a manipulator, a welding feeder device mounted on the manipulator, and peripheral devices, such as various kinds of sensors and a handling holder device.

The electric cables are connected to control devices or external devices such as a welding power supply at a connector. A cable opening is disposed in a connection case of a manipulator base section. Specifications for, and the number of the signal lines of the electric cables that connect between the manipulator and the control devices, are determined by a motor that drives joint axes of the manipulator. On the other hand, the signal lines of the electric cables that connect the manipulator to the external devices including a welding power supply vary in specifications and quantity because peripheral devices to be mounted on the manipulator depend on the use of the robot.

The cables routed through the inside of the manipulator undergo bending or torsion caused by rotating motions of the joints of the manipulator. The need for mechanical durability imposes limitations on the specifications and quantity of the signal lines. In other words, due to the limitation, the cables routed inside the manipulator cannot be simply increased in diameter or quantity.

As for cable connection at a connection case of a manipulator, a method in which a split connector is used for one frame, as shown in FIG. 9A and FIG. 9B, is conventionally known. The method, for example, is disclosed in Japanese Patent Unexamined Publication No. H11-129185.

FIG. 9A is a sectional view illustrating an essential part of the interior of the connection case of a conventional robot. FIG. 9B is a sectional view of a conventional split connector shown in FIG. 9A. Internal cable 8 is inserted through opening 13 of base 2 of the robot. Split connector 15 is disposed in hole 14 formed in base 2. Split connector 15 has frame 16 and housing 17. Frame 16 has five slots 16a in a row, each of which contains a housing 17, such that five housings 17 are accommodated in frame 16. Wires 12 of internal cable 8 are connected to each of four terminal fittings 17a; twenty wires 12 are connected to split connector 15 in all. Besides, second connector 10, which is disposed outside base 2, is removably connected to split connector 15. Second connector 10 further has a connection to external cable 7 connected to an external device. The connection relationship between external cable 7 and internal cable 8 via wires 12 and split connector 15 has a one-to-one correspondence, that is, a fixed connection.

According to the structure above, a split connector is disposed at one end of an electric cable routed through the inside of the manipulator. The use of the split connector allows a through-hole for passing cables to the connection case to be made small, whereby the connection case can be decreased in size. However, the signal connection between the internal cable and the external cable remains one-to-one correspondence (fixed) relation. Due to this constraint, when a control device with a built-in welding power supply as an external device is connected to the manipulator, the manipulator needs cable connections not only for the control device, but also for the power supply. This causes an increase in the number of external cables connecting between the manipulator and the control device.

In a case where the control device and the welding power supply are separately connected to the manipulator, some kind of welding feeder device mounted on the manipulator or peripheral devices such as a sensor require that the signal cables of the peripheral devices should be separately connected to the control device and the welding feeder device. The cables therefore must be separated outside the manipulator.

In another case where a peripheral device, such as a sensor, is disposed close to the manipulator, the signal cable of the peripheral device needs to have an additional cable connection to a control device.

As described above, specifications for signal lines and connections largely depend on the use of the robot. The fixed signal-connection (i.e., one-to-one correspondence) between the internal cable and the external cable causes an increase in the number of external cables or the need for cable separation outside the manipulator. This inconvenience has invited complicated routing of the external cables, has increased the space occupied by the cables, and has increased production costs.

SUMMARY OF THE INVENTION

According to the present invention, the manipulator-type robot, which has internal cables routed through inside the manipulator so as to establish connection to external devices, contains inside connectors and outside connectors. Each of the inside connectors is directly or indirectly connected to a predetermined signal line of signal lines constituting the internal cables, while each of the outside connectors is directly or indirectly connected to a predetermined signal line of signal lines coming from outside the manipulator. With the structure above, a different connection route is obtained by a selective connection between the inside connectors and the outside connectors.

As another aspect of the present invention, the manipulator-type robot, which has internal cables routed through the inside of the manipulator so as to establish connection to external devices, contains first inside connectors, second inside connectors, first outside connectors, and second outside connectors. Each of the first inside connectors is directly or indirectly connected to one end of a predetermined signal line of signal lines constituting the internal cables, while each of the second inside connectors is directly or indirectly connected to the other end of a predetermined signal line of signal lines constituting the internal cables. On the other hand, each of the first outside connectors is directly or indirectly connected to a predetermined signal line of signal lines from a first external device. Similarly, each of the second outside connectors is directly or indirectly connected to a predetermined signal line of signal lines from a second external device. With the structure above, a different connection route is obtained by at least any one of a selective connection between first inside connectors and the first outside connectors and a selective connection between the second inside connectors and the second outside connectors.

As still another aspect of the present invention, the manipulator-type robot contains first outside connectors each of which is directly or indirectly connected to a predetermined signal line of signal lines of a first external device, and second outside connectors each of which is directly or indirectly connected to a predetermined signal line of signal lines of a second external device. With the structure above, a different connection route is obtained by a selective connection between the first outside connectors and the second outside connectors.

BRIEF DESCRIPTION OF THE DRAWINGS

FIG. 9A is a sectional view illustrating an essential part of an interior of a connection case of a conventional industrial robot.

FIG. 9B is a sectional view illustrating a conventional split connector for the connection case shown in FIG. 9A.

DETAILED DESCRIPTION OF THE PREFERRED EMBODIMENTS

First Exemplary Embodiment

Figure 1:
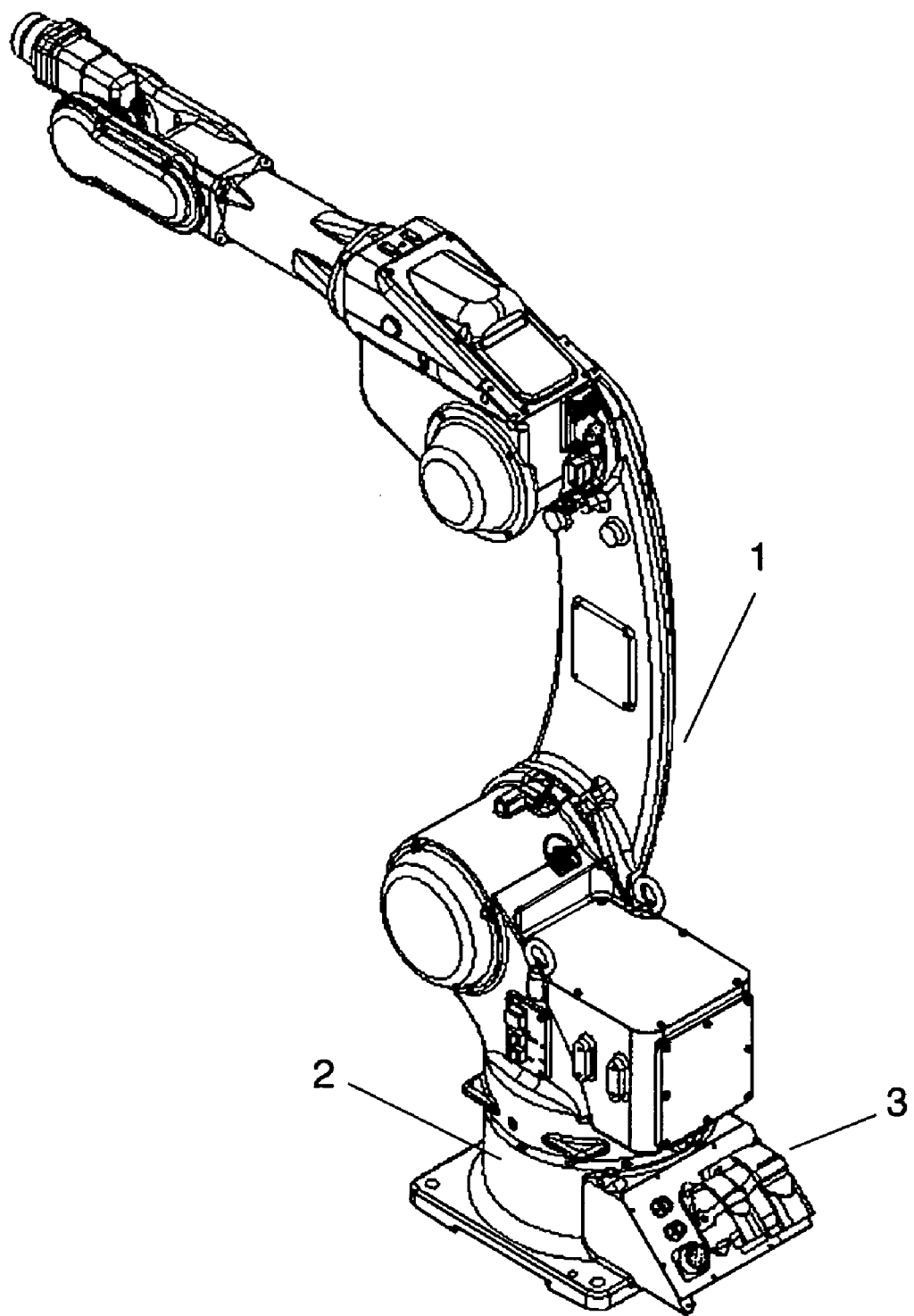
FIG. 1 is a perspective view of a manipulator in accordance with a first exemplary embodiment of the present invention.
Figure 2:
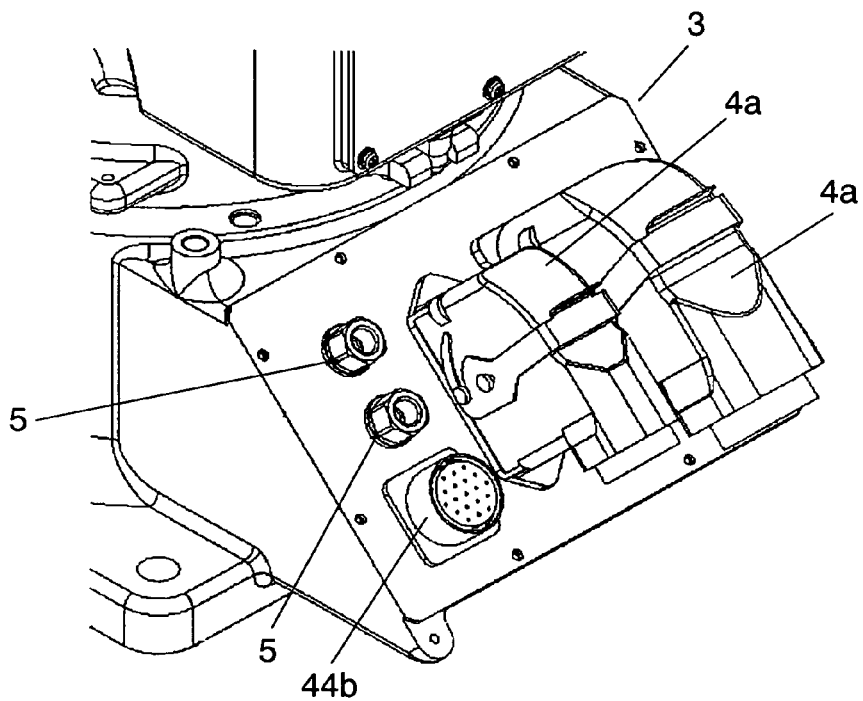
FIG. 2 is a perspective view of a connection case in accordance with the first exemplary embodiment.

FIG. 1 is a perspective view of a manipulator that constitutes an industrial robot in accordance with a first exemplary embodiment of the present invention. Manipulator 1 is disposed on base 2. Connection case 3 has a connector for establishing a cable connection to an external device, such as a control device. FIG. 2 is a perspective view of connection case 3. Connection case 3 contains external connector 4a for first external device 100 (not shown in FIGS. 1-3), internal connector 44b for second external device 200 (not shown in FIGS. 1-3), and bulkhead union 5. External connector 4a establishes a cable connection to first external device 100, and similarly, internal connector 44b establishes a cable connection to second external device 200. Bulkhead union 5 is used for connecting fluid pipes that carry air or gas.

Figure 3:
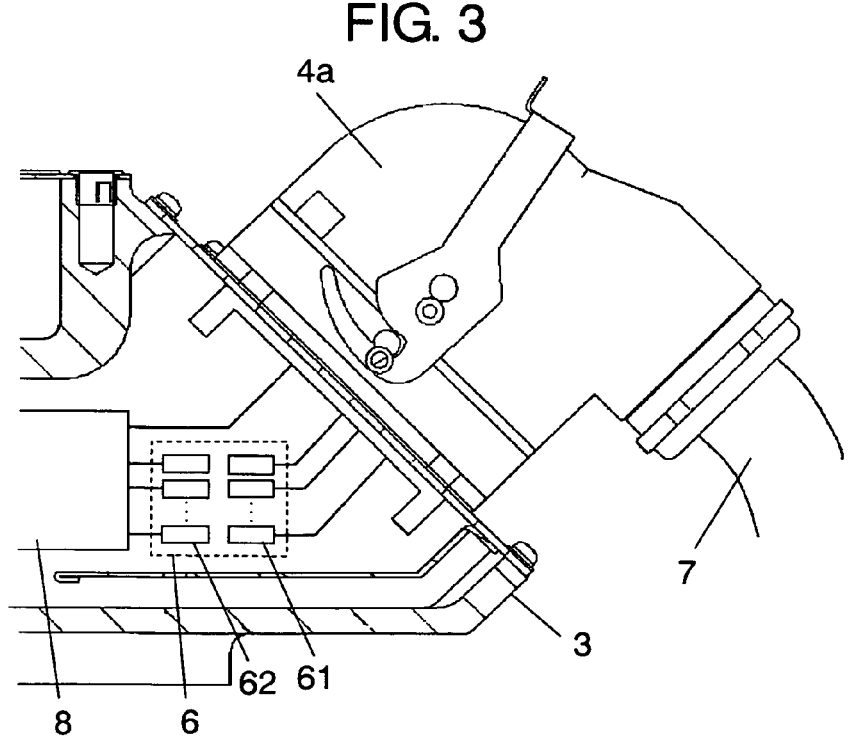
FIG. 3 is a sectional view illustrating an essential part of the connection case in accordance with the first exemplary embodiment.

FIG. 3 is a sectional view illustrating an essential part of the general structure of connection case 3. First external device 100 has a cable connection to manipulator 1 via external cable 7a, external connector 4a, and internal connector 44a. Similarly, although not shown in FIG. 3, second external device 200 has a cable connection to manipulator 1 via external cable 7b, external connector 4b, and internal connector 44b. Internal cable 8, which contains electric cables and fluid pipes for carrying air or gas, is routed through the inside of manipulator 1. These cables and pipes above are used for the motor that drives joint axes of manipulator 1, a welding feeder device mounted on manipulator 1, and peripheral devices including sensors and handling holders. Signal connecting section 6 is responsible for signal connection in connection case 3. Connector 61 disposed on the external cable-side contains a plurality of connectors each of which is directly or indirectly connected to a signal line of external cables 7a and 7b. The "indirect connection" with the signal lines means that the signal lines are connected via a connector. Similarly, connector 62 disposed on the internal cable-side contains a plurality of connectors each of which is directly or indirectly connected to a signal line of internal cable 8. Employing connectors 61 and 62 offers a selective connection between a predetermined signal line of internal cable 8 and external connectors 4a, 4b (i.e., a predetermined signal line of external cables 7a, 7b). That is, a different connection route is obtained by selectively connecting inside connector 62 to outside connector 61 in signal connecting section 6, whereby specifications in signal lines and connections between manipulator 1 and external devices can be easily changed.

Figure 4:
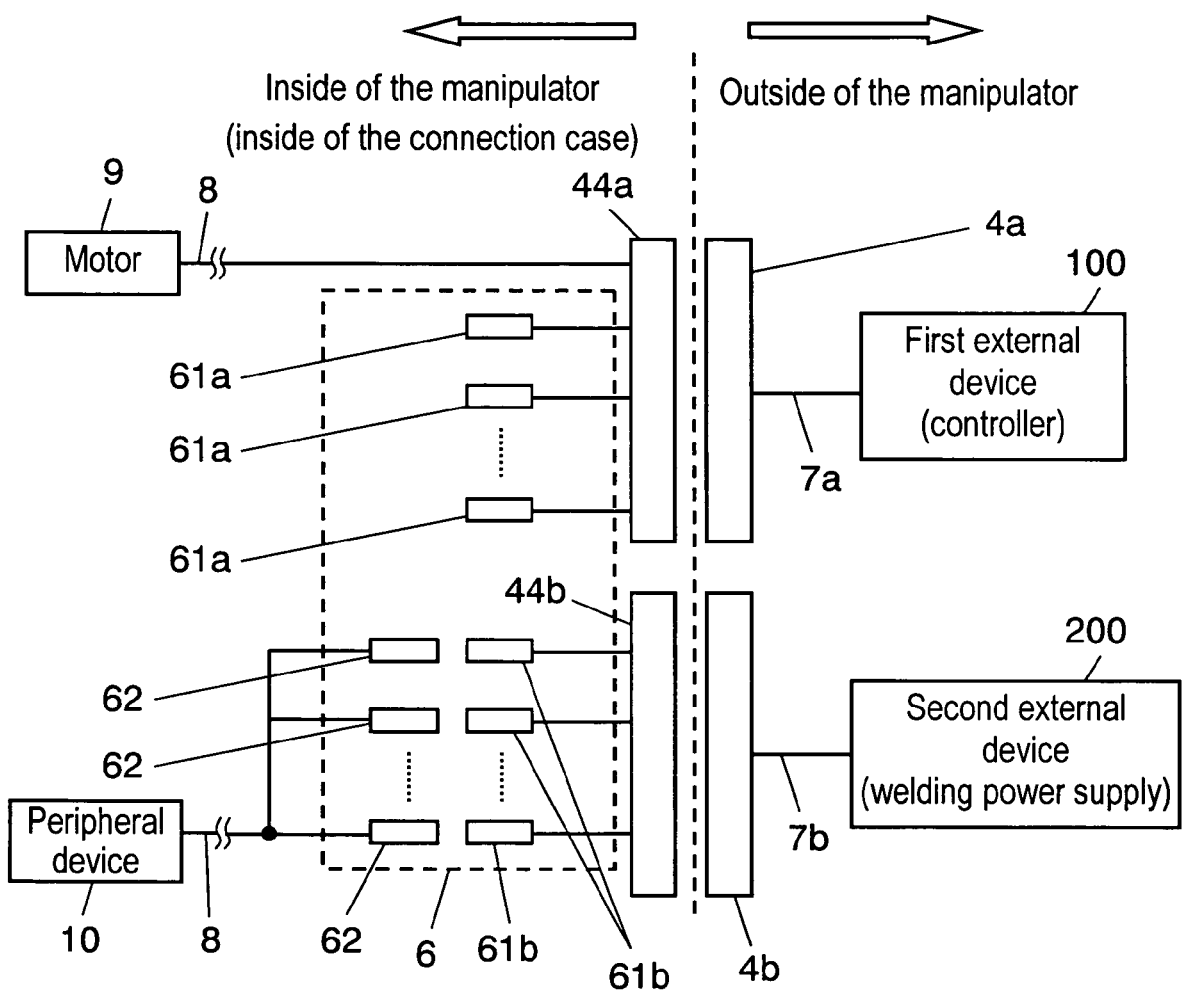
FIG. 4 shows a wiring diagram of an interior of the connection case in accordance with the first exemplary embodiment.

FIG. 4 shows a wiring diagram of the interior of the connection case of the embodiment. In signal connecting section 6, inside connector 62 is selectively connected between outside connector 61a for first external device 100 and outside connector 61b for second external device 200.

According to the embodiment, the signal lines of internal cable 8 connected to outside connector 61a make a cable connection to first external device 100 (here in the diagram, a controller) via internal connector 44a, external connector 4a, and external cable 7a. On the other hand, the signal lines of internal cable 8 connected to outside connector 61b make a cable connection to second external device 200 (here in the diagram, welding power supply) via internal connector 44b, external connector 4b, and external cable 7b. Motor 9 is connected to internal connector 44a via internal cable 8.

When inside connector 62 is connected to outside connector 61b, a predetermined signal line from peripheral device 10 mounted on manipulator 1 and connected to internal cable 8 is connected to second external device 200.

When inside connector 62 is connected to outside connector 61a, a predetermined signal line from peripheral device 10 mounted on manipulator 1 is connected to first external device 100, whereby signal exchange between peripheral device 10 and first external device 100 is established.

By virtue of the structure in which internal cable 8 of manipulator 1 is selectively connected between the signal lines of external cable 7a and the signal lines of external cable 7b, peripheral device 10 can be easily replaced as necessary. The selective connection increases the range of uses of the structure.

As outside connectors 61a, 61b and inside connector 62, a flying-type square connector may be used, and the connection change may be done manually.

Second Exemplary Embodiment

Figure 5:
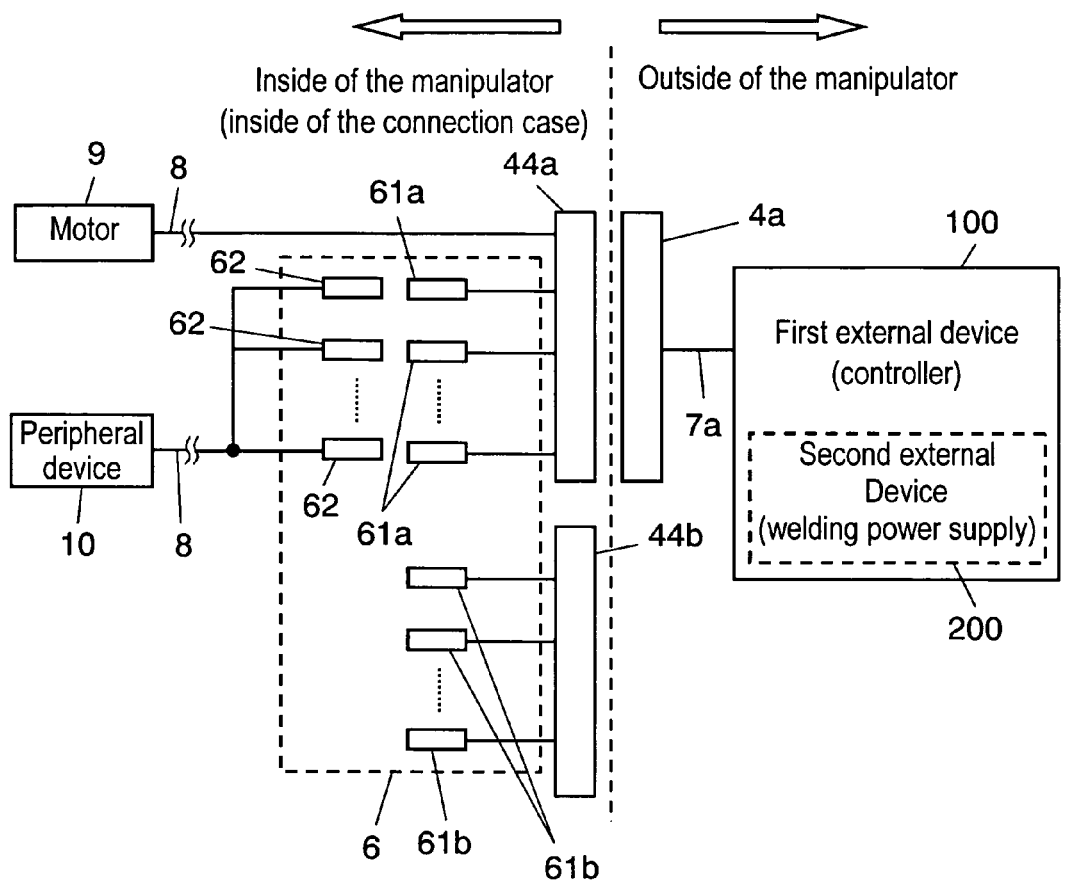
FIG. 5 shows a wiring diagram of an interior of a connection case in accordance with a second exemplary embodiment.

In the structure of the second exemplary embodiment, like parts have similar reference marks as in the structure of the first exemplary embodiment, and the detailed explanation thereof will be omitted. FIG. 5 shows a wiring diagram of the interior of connection case 3 in the embodiment. The structure differs from the structure described in the first exemplary embodiment in that first external device 100 is formed into an integrated control device containing second external device 200, such as a welding power supply.

According to the structure of the second embodiment, the signal lines connected to outside connector 61a make a cable connection to first external device 100 (for example, a control device with a built-in welding power supply) via internal connector 44a, external connector 4a, and external cable 7a. Motor 9 is connected to internal connector 44a via internal cable 8.

When inside connector 62 is connected to outside connector 61a, a predetermined signal line from peripheral device 10 mounted on manipulator 1 and connected to internal cable 8 is connected to first external device 100.

In the structure, second external device 200 is integrated into first external device 100, and the signal lines of first external device 100 and second external device 200 are bundled together as an external cable of first external device 100 connected to manipulator 1. This eliminates cable connections via external connector 4b (not shown). That is, connection case 3 requires no other cable but external cable 7a, thereby decreasing the number of external cables. Specifically, when connection case 3 has the structure shown in FIG. 2, the structure needs three external cables in all; two (i.e., one is as a control cable, and the other is as a power cable) external cables 7a (not shown) connecting between first external device 100 and external connector 4a, and external cable 7b (not shown) connecting between second external device 200 and internal connector 44b. On the other hand, employing the structure of the embodiment, as shown in FIG. 5, eliminates external cable 7b (not shown) connecting between second external device 200 and internal connector 44b, thereby establishing the connection between the manipulator and the external device with only two external cables 7a. External cables are thus decreased in number. Although the embodiment introduces a structure in which two external cables 7a are used, it is not limited thereto; it will be understood that the embodiment is applicable to a structure having single external connector 4a and single external cable 7a.

Besides, the structure without external cable 7b means that internal connector 44b is also not required, which contributes to a space-saved wiring with reduced production cost. A structure in which connection case 3 contains removable internal connector 44b is also effective. In this case, internal connector 44b can be removed as required.

Third Exemplary Embodiment

Figure 6:
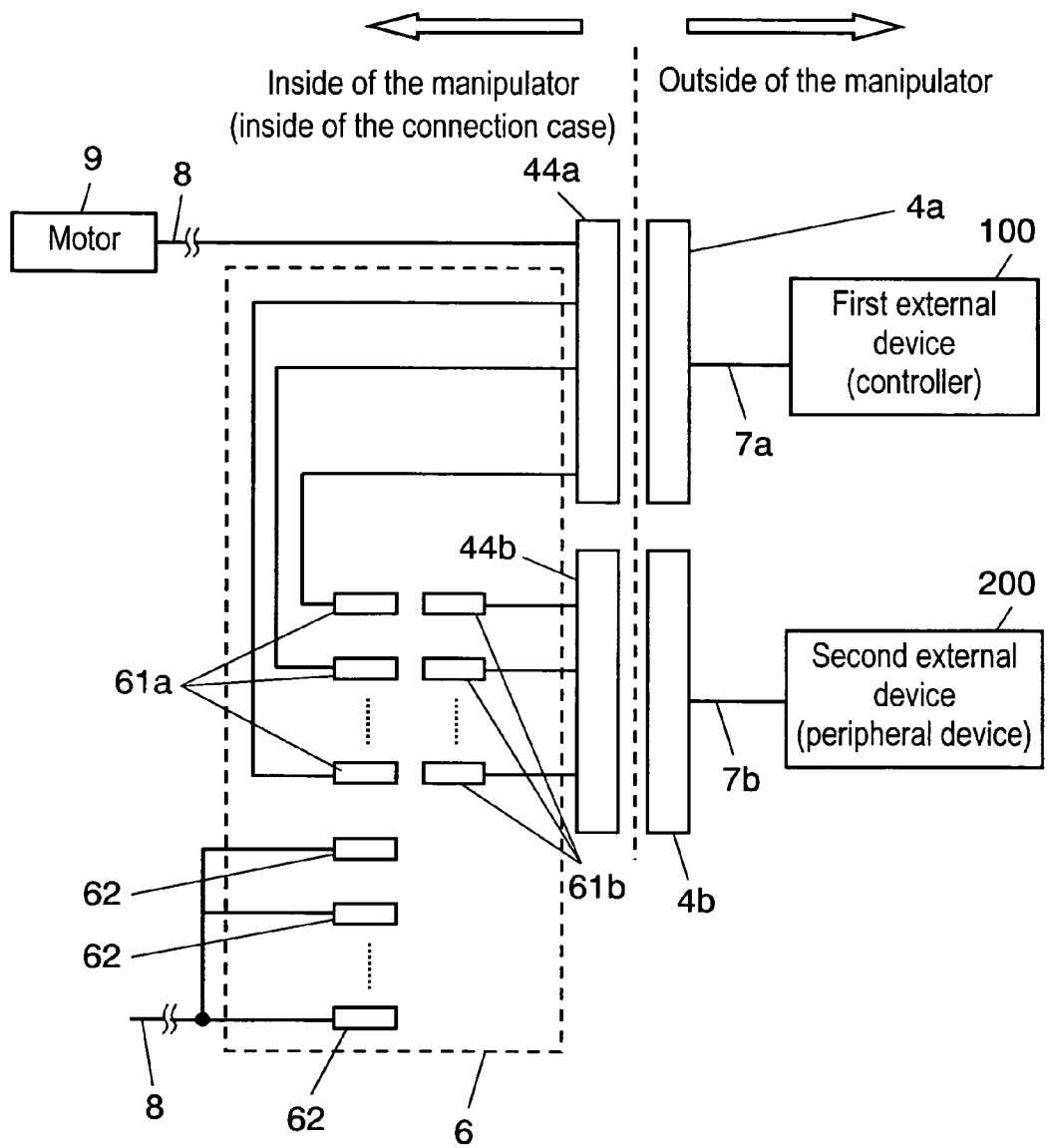
FIG. 6 shows a wiring diagram of an interior of a connection case in accordance with a third exemplary embodiment.

In the structure of the third exemplary embodiment, like parts have similar reference marks as in the structure of the first exemplary embodiment, and the detailed explanation thereof will be omitted. FIG. 6 shows a wiring diagram of the interior of connection case 3 of the embodiment. The structure differs from that described in the first embodiment in that external devices are connected via connection case 3. Like the structure in the first embodiment, motor 9 is connected to internal connector 44a via internal cable 8.

According to the embodiment, when a peripheral device, such as a sensor, is disposed as second external device 200 close to manipulator 1, second external device 200 has cable connections to external connector 4b via external cable 7b. An air cylinder or a positioner can be second external device 200 (i.e., a peripheral device) disposed adjacent to manipulator 1.

In connection case 3, when connector 61a connected to first external device 100 is connected to connector 61b connected to second external device 200, the signal lines of second external device 200 make cable connections to first external device 100 (here in the description, a controller) via internal connector 44a, external connector 4a, and external cable 7a.

As described above, by virtue of the structure capable of establishing connections between first external device 100 and second external device 200 in connection case 3, second external device 200 disposed adjacent to manipulator 1 can make connections to first external device 100 through cable connections with connection case 3. Employing the structure eliminates a cable that directly connects second external device 200 to first external device 100 disposed away from device 200, thereby decreasing the wiring length of the external cable.

Connecting first external device 100 to second external device 200 allows first external device 100 (for example, a controller) to control second external device 200 (for example, a positioner).

Fourth Exemplary Embodiment

Figure 7:
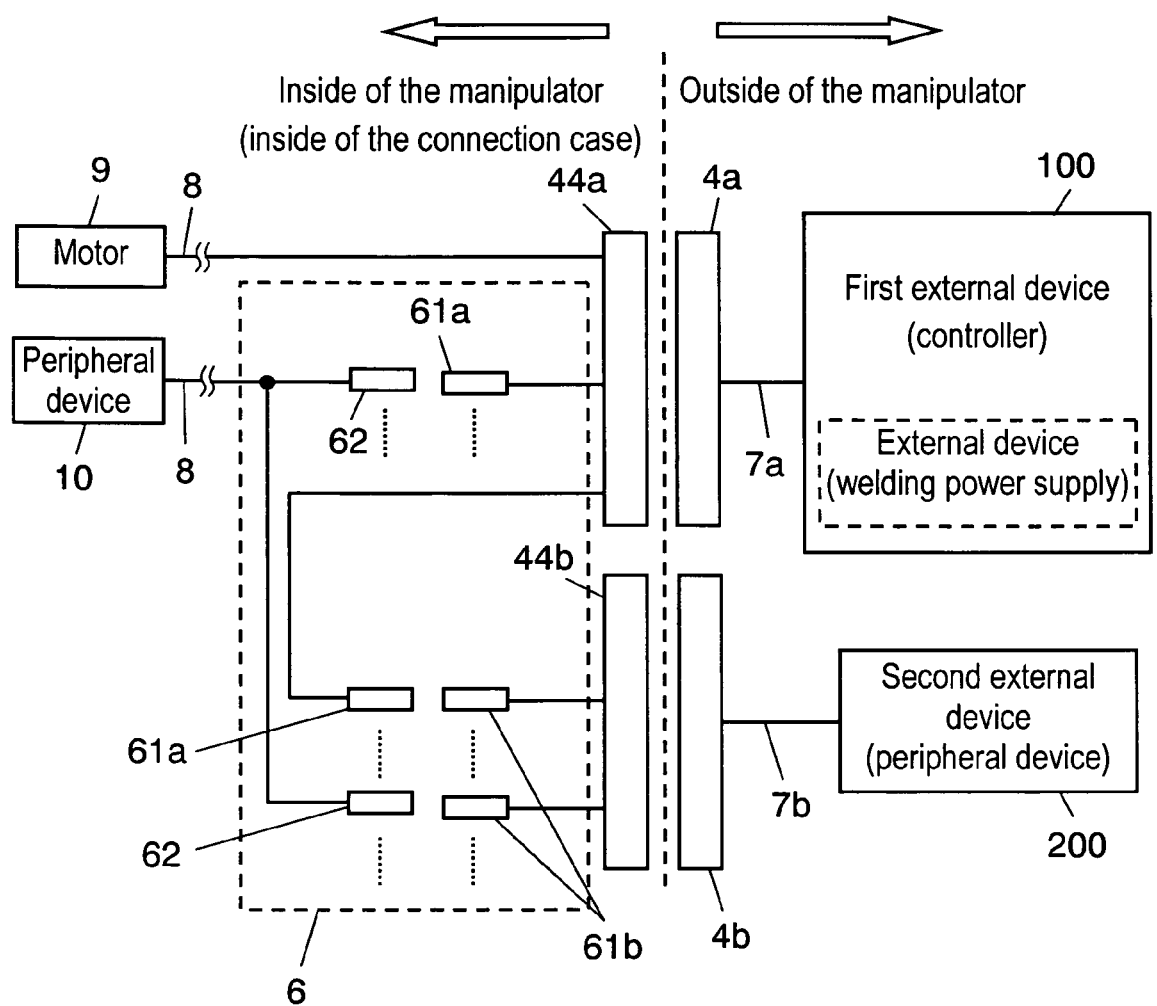
FIG. 7 shows a wiring diagram of an interior of a connection case in accordance with a fourth exemplary embodiment.

In the structure of the fourth exemplary embodiment, like parts have similar reference marks as in the structures of the first through the third exemplary embodiments, and the detailed explanation thereof will be omitted. FIG. 7 shows a wiring diagram of the interior of connection case 3 of the embodiment.

In the fourth embodiment, the description is given of the following structure. Peripheral device 10 is mounted on manipulator 1. As first external device 100, a control device with a built-in welding power supply is disposed. As second external device 200, a peripheral device, such as a sensor, is disposed adjacent to manipulator 1. That is, the structure above is an all-inclusive example of the first through the third embodiments. Like in the first embodiment, motor 9 is connected to internal connector 44a via internal cable 8.

First external device 100 makes cable connections to external connector 4a via external cable 7a; similarly, second external device 200 makes cable connections to external connector 4b via external cable 7b.

In the aforementioned structure, connecting a part of inside connector 62 (i.e., a first inside connector) to a part of outside connector 61a establishes connections between first external device 100 and a predetermined signal line of peripheral device 10 mounted on manipulator 1. Signal exchange between first external device 100 and peripheral device 10 is thus obtained.

Further, connecting a part of inside connector 62 (i.e., a second inside connector) to a part of outside connector 61b establishes connections between second external device 200 and a predetermined signal line of peripheral device 10 mounted on manipulator 1. Signal exchange between second external device 200 and peripheral device 10 is thus obtained.

Still further, connecting a part of outside connector 61a to a part of outside connector 61b establishes connections between first external device 100 and second external device 200. Signal exchange between first external device 100 and second external device 200 is thus obtained.

Through the connections between outside connector 61a and the first inside connector and the connections between outside connector 61b and the second inside connector, peripheral device 10 mounted on manipulator 1, first and second external devices 100, 200 disposed adjacent to manipulator 1 establish a cable connection. The structure substantially decreases the external cables in number and in length, and accordingly, offers simple wiring for a wide range of connections. At the same time, the structure easily realizes space- and cost-savings for the wiring.

Although the structure of the embodiment is described as an all-inclusive example of the first through the third embodiments, it is not limited thereto; a combination of two of the structures in the three embodiments is also effective.

Although the first through the fourth embodiments consistently describe a structure that contains connection case 3 for connecting the signal lines therein, it is not limited thereto; the signal connecting section can be disposed inside manipulator 1, instead of connection case 3.

Figure 8:
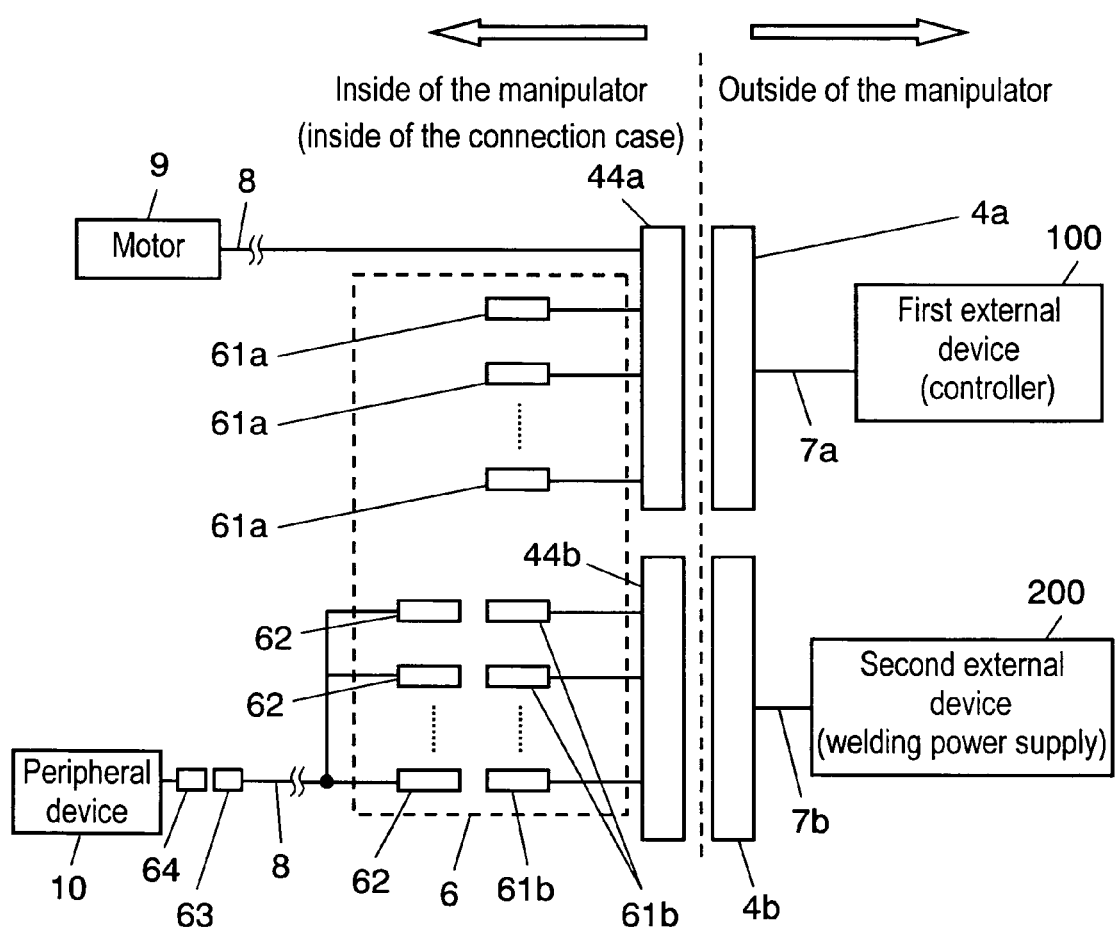
FIG. 8 shows a wiring diagram of an interior of a connection case in accordance with a fifth exemplary embodiment.

Throughout the four embodiments described so far, the description focuses on the external device-side connection, that is, the connection of first and second external devices 100, 200, and external cables 7a, 7b. The structure is also applicable to the connection on the side of peripheral device 10. In this case, internal cable 8 is formed so as to have both ends selectively connected between a peripheral device and an external device. For example, as shown in FIG. 8, inside connector 63 is disposed at an end of internal cable 8, and connector 64 is disposed on the side of peripheral device 10. Employing connector 63 and connector 64 allows internal cable 8 to make selective connections between peripheral device 10 and an external device. By virtue of the structure, peripheral device 10 is easily changed (or replaced). At the same time, first and second external devices 100, 200 that communicate with peripheral device 10 are also easily changed. When peripheral device 10 needs to be changed, there is no need to change internal cable 8. That is, the structure above allows a peripheral device or an external device to have selective connections without replacement of internal cable 8. It will be understood that a structure having internal cable 8 capable of realizing the selective connection, not at both ends of the cable, but on the peripheral device-side only, is also effective. In this case, too, a peripheral device is easily replaced.

The structure of the present invention easily and cost-effectively simplifies wiring of external cables and saves wiring space so as to be applicable to a wide range of uses. The structure is particularly effective in a manipulator-type robot that operates in connection with an external device.

The invention claimed is:

1. A manipulator-type robot arrangement for connection to at least one of first external device signal lines of a first external device and second external device signal lines of a second external device, comprising:
    a manipulator including a manipulator connection case;
    an internal cable routed through an inside of said manipulator, said internal cable including a plurality of signal lines;
    inside connectors provided in said connection case, each of said inside connectors being connected, directly or indirectly, to one of said plurality of signal lines of said internal cable;
    first outside connectors provided in said connection case and being configured to be connected, directly or indirectly, to the first external device signal lines of the first external device; and
    second outside connectors provided in said connection case and being configured to be connected, directly or indirectly, to the second external device signal lines of the second external device;
    wherein said inside connectors, said first outside connectors, and said second outside connectors are configured to enable a selective connection between at least part of said inside connectors, at least part of said first outside connectors, and at least part of said second outside connectors so as to enable selection of different connection routes between said inside connectors, said first outside connectors, and said second outside connectors.

2. The manipulator-type robot arrangement according to claim 1, further comprising
    a first internal connector provided in said connection case and connected, directly or indirectly, to said first outside connectors, said first internal connector being arranged for connection to a first external connector connected to the first external device.

3. The manipulator-type robot arrangement according to claim 2, further comprising
    a second internal connector provided in said connection case and connected, directly or indirectly, to said second outside connectors, said second internal connector being arranged for connection to a second external connector connected to the second external device.

4. The manipulator-type robot arrangement according to claim 1, further comprising
    a first internal connector provided in said connection case and connected, directly or indirectly, to said first outside connectors; and
    a first external connector provided outside said connection case and adapted to connect to the first external device signal lines of the first external device, said first external connector being configured for connection to said first internal connector.

5. The manipulator-type robot arrangement according to claim 4, further comprising
    a second internal connector provided in said connection case and connected, directly or indirectly, to said second outside connectors; and
    a second external connector provided outside said connection case and adapted to connect to the second external device signal lines of the second external device, said second external connector being configured for connection to said second internal connector.

6. The manipulator-type robot arrangement according to claim 1, further comprising
    a first internal connector provided in said connection case and connected, directly or indirectly, to said first outside connectors;
    the first external device having the first external device signal lines; and
    a first external connector provided outside said connection case and connected to said first external device signal lines of said first external device, said first external connector being configured for connection to said first internal connector.

7. The manipulator-type robot arrangement according to claim 6, wherein
    said first external device signal lines are bundled together as a first external cable.

8. The manipulator-type robot arrangement according to claim 6, wherein
    said first external device comprises a controller for controlling the manipulator.

9. The manipulator-type robot arrangement according to claim 6, further comprising
    a second internal connector provided in said connection case and connected, directly or indirectly, to said second outside connectors;
    the second external device having the second external device signal lines; and
    a second external connector provided outside said connection case and connected to said second external device signal lines of said second external device, said second external connector being configured for connection to said second internal connector.

10. The manipulator-type robot arrangement according to claim 9, wherein
    said second external device signal lines are bundled together as a second external cable.

11. The manipulator-type robot arrangement according to claim 9, wherein
   said first external device comprises a controller for controlling the manipulator; and
   said second external device comprises a peripheral device including a positioner and a sensor.

12. The manipulator-type robot arrangement according to claim 11, wherein
   said first external device is connected to said second external device via said first and second external connectors.

* * * * *